United States Patent [19]

Ohashi

[11] 4,214,829
[45] Jul. 29, 1980

[54] PHOTOGRAPHIC CAMERA WITH BUILT-IN OPTICAL CONVERTER

[75] Inventor: Saichiro Ohashi, Kyoto, Japan

[73] Assignee: Fuji Photo Film Co., Ltd., Minami-ashigara, Japan

[21] Appl. No.: 911,541

[22] Filed: Jun. 1, 1978

[30] Foreign Application Priority Data

Jun. 1, 1977 [JP] Japan ................................ 52-64355

[51] Int. Cl.² .......................... G03B 3/00; G03B 13/02
[52] U.S. Cl. .................................. 354/197; 354/198; 354/199
[58] Field of Search ................. 354/53, 163, 167, 168, 354/195, 197–199, 222; 352/93, 142

[56] References Cited

U.S. PATENT DOCUMENTS

| 2,906,172 | 9/1959 | Klemt | 354/197 X |
| 3,006,262 | 10/1961 | MacMillin | 354/197 |
| 3,665,834 | 5/1972 | Loewe | 354/197 X |
| 3,836,934 | 9/1974 | Suzuki et al. | 354/222 X |

FOREIGN PATENT DOCUMENTS

| 925189 | 5/1963 | United Kingdom | 354/197 |
| 1009710 | 11/1965 | United Kingdom | 354/53 |

Primary Examiner—L. T. Hix
Assistant Examiner—Thomas H. Tarcza
Attorney, Agent, or Firm—Sughrue, Rothwell, Mion, Zinn and Macpeak

[57] ABSTRACT

A photographic camera comprising a principal objective lens assembly including an objective lens mount and a focus adjusting ring carried by the camera body through a fixed barrel for rotation through first and second predetermined focusing angle. The focus adjusting ring is operatively coupled to the objective lens mount such that rotation of the focus adjusting ring results in linear movement of the objective lens mount in an axial direction parallel to the optical axis of the objective lens. An optical converter lens is supported for movement between an inoperative position, in which the converter lens is out of alignment with the optical axis of the objective lens, and an operative position in which the converter lens is aligned with the optical axis of the objective lens. This optical converter is brought into the operative position when the focus adjusting ring is rotatable through the second focusing angle while it is brought into the inoperative position when the focus adjusting ring is rotatable through the first focusing angle.

6 Claims, 11 Drawing Figures

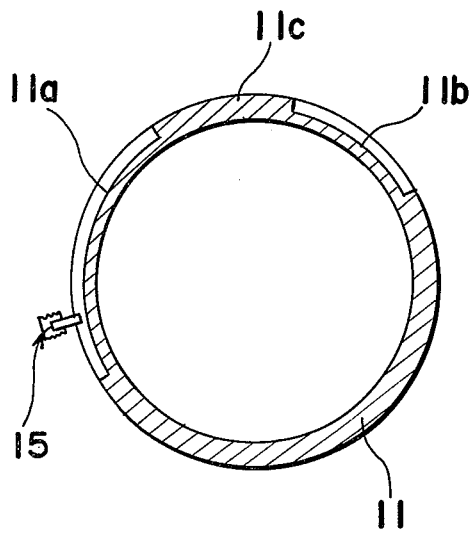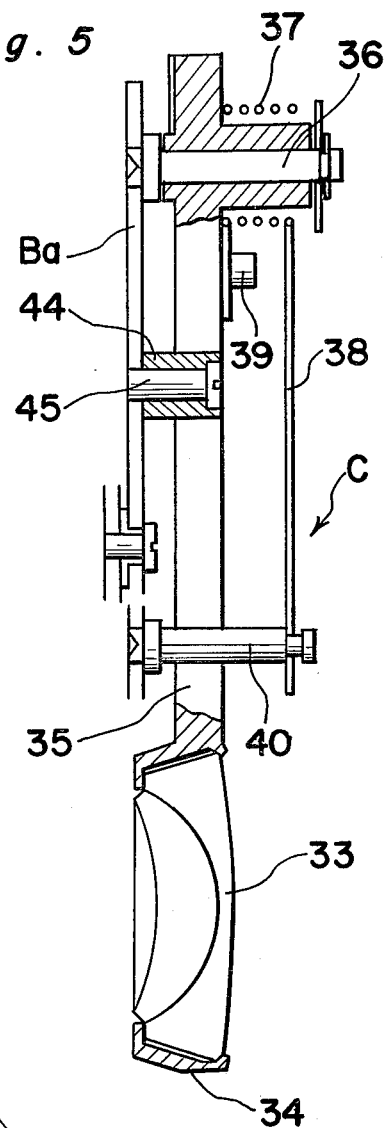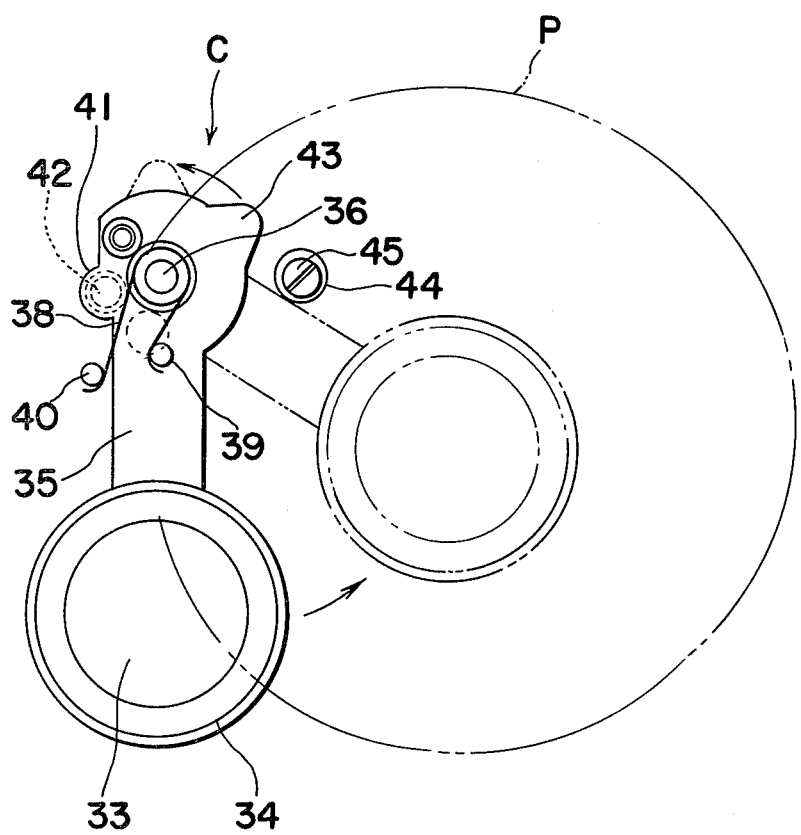

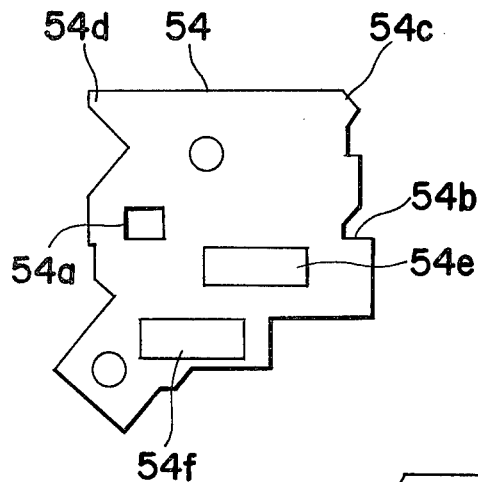
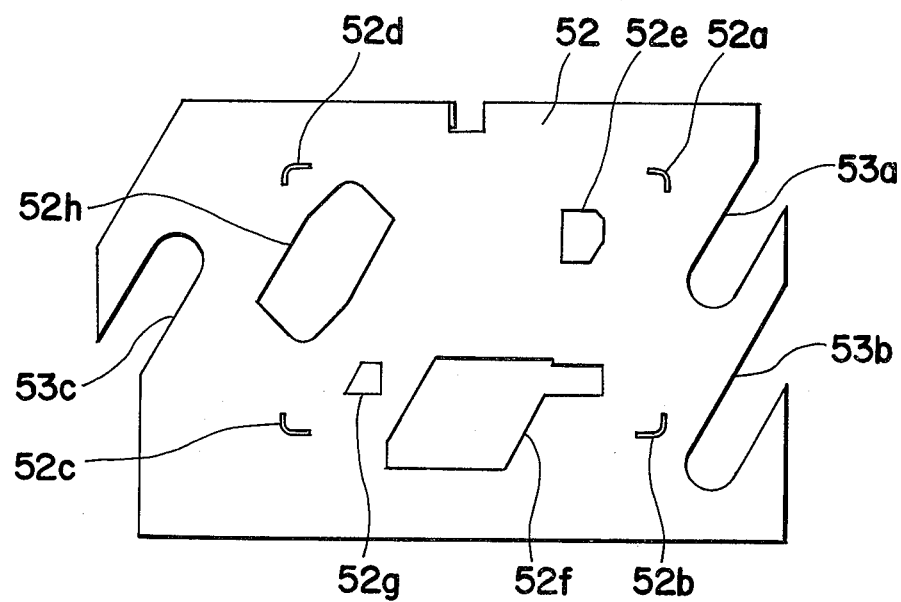
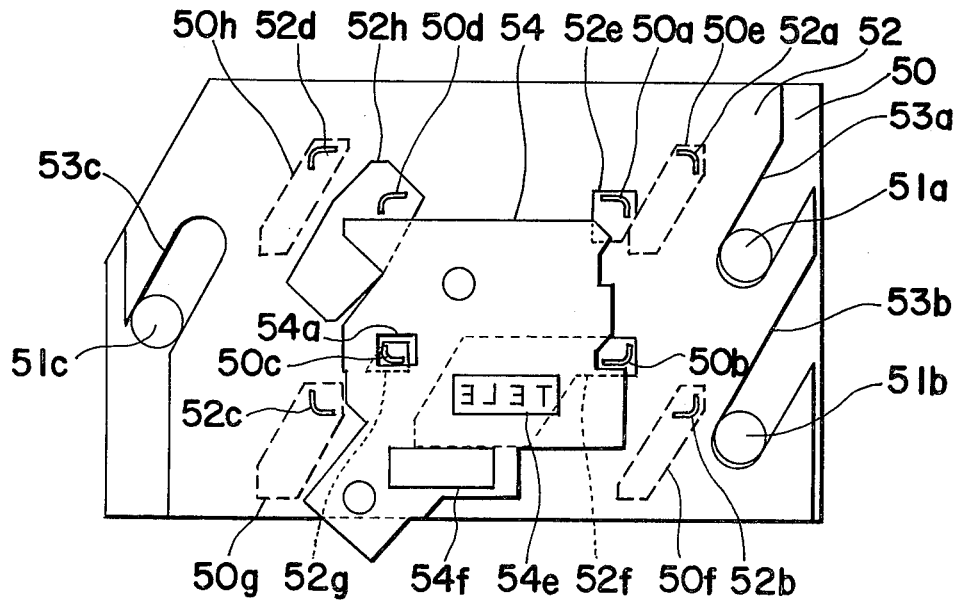

PHOTOGRAPHIC CAMERA WITH BUILT-IN OPTICAL CONVERTER

BACKGROUND OF THE INVENTION

The present invention generally relates to a photographic camera and, more particularly, to a photographic camera of a type having a rangefinder and a built-in optical converter.

Although a lens interchangeable model is available, most rangefinder cameras have an objective lens assembly rigidly fixed to the camera body. This fixed objective lens assembly has a focal length generally within the range of 40 to 55 mm. and is generally referred to as a standard lens because of its similarity in optical capacity to the human eyes.

On the other hand, the rangefinder camera equipped with a built-in optical converter separately of the standard lens is well known to those skilled in the art. In this known photographic camera, the built-in optical converter generally serves to transmit a spatial image, formed by the standard lens of a target object to be photographed, to a photographic film on a scale different from that of the image projected onto the film solely by the standard lens, for example, on a magnified scale, when such built-in optical converter is brought into alignment with the optical axis of the standard lens. So far as magnification is involved, this optical converter is generally referred to as a telephoto converter.

In the known photographic camera of the type having the built-in optical converter, for example, the telephoto converter, a required switching mechanism for selectively bringing the telephoto converter into and out of alignment with the optical axis of the standard lens has heretofore been employed separately of a focus adjusting ring manipulatably mounted on the standard lens barrel.

Although the provision of the switching mechanism separately of the focus adjusting ring does not adversely affect the optical performance of the camera lens system as a whole, various inconveniences have been found in manipulating the camera. For example, with the conventional rangefinder camera of the construction described above, a photographer has to make a decision, prior to actual taking of a photographic picture of the target object, as to whether the target object should be shot with the standard lens system or whether the same should be shot with the telephoto lens system. Should the photographer decide to take a photographic picture of the target object with the telephoto lens system in the course of focus adjustment while the telephoto converter is held out of alignment with the optical axis of the standard lens, he has to interrupt the focusing operation to manipulate the switching mechanism, the consequence of which is that the photographer may loses a decisive shutter chance.

Even though the decisive shutter chance is of less importance, a similar disadvantage is often experienced that, while the photographer looks into the rangefinder with the camera held in one of his hands, he must move the other hand between the focus adjusting ring and the switching mechanism in chosing a suitable composition of the image of the target object within the framework of the viewfinder, thereby requiring a complicated handling procedure.

SUMMARY OF THE INVENTION

Accordingly, the present invention has been developed to substantially eliminate the above described inconveniences and disadvantages inherent in the prior art photographic camera of a type having an optical converter capable of being selectively brought into and out of alignment with the optical axis of a principal objective lens system, attached to the camera body, at a position substantially between the principal lens system and the photographic film within the camera body. The present invention, therefore, has for its essential object to provide an improved photographic camera wherein the switching of the converter into and out of alignment with the optical axis of the principal objective lens system can be achieved only by manipulating the focus adjusting ring.

Another important object of the present invention is to provide an improved photographic camera of the type referred to above, wherein the rangefinder arrangement is equipped with an index frame display structure operable for automatically selecting any one of two frame markings depending upon whether or not the optical converter is brought into alignment with the optical axis of the principal lens system.

A further object of the present invention is to provide an improved photographic camera of the type referred to above, which is easy to handle and which can be placed in a commercial market at a reasonable and relatively low cost.

A still further object of the present invention is to provide an improved photographic camera of the type referred to above, which can be manufactured in a compact size.

According to the present invention, a photographic camera comprises a principal objective lens assembly including an objective lens mount and a focus adjusting ring carried by the camera body through a fixed barrel for rotation through a first predetermined focusing angle and also through a second predetermined focusing angle, said first and second focusing angles being spaced from each other and the sum of said first and second focusing angles being less than 360°. The focus adjusting ring is operatively coupled to the objective lens mount such that rotation of the focus adjusting ring results in linear movement of the objective lens mount in an axial direction parallel to the optical axis of the objective lens.

A converter lens assembly including a converter lens is carried behind the objective lens assembly and is so operatively coupled to the focus adjusting ring that, so long as the focus adjusting ring is rotated through the first focusing angle, the converter lens assembly is in inoperative position with the converter lens out of alignment with the optical axis of the objective lens and, so long as the focus adjusting ring is rotated through the second focusing angle, the converter lens assembly is in operative position with the converter lens in alignment with the optical axis of the objective lens.

The photographic camera embodying the present invention further comprises a rangefinder arrangement including an index frame display structure for presenting to the eye of a photographer looking through the rangefinder eyepiece, information showing whether the camera is ready to shoot with the objective lens or whether the camera is ready to shoot with a combination of the objective lens with the converter lens. This index frame display structure is operatively coupled with the focus adjusting ring.

BRIEF DESCRIPTION OF THE DRAWINGS

These and other objects and features of the present invention will become apparent from the following description taken in conjunction with a preferred embodiment thereof with reference to the accompanying drawings, in which:

FIG. 3 is an end view of a fixed barrel employed in the objective lens assembly shown in FIG. 1;

FIG. 4 is a a front elevational view of the optical converter and its support structure;

FIG. 5 is a longitudinal sectional view of the optical converter shown in FIG. 4;

FIGS. 8 and 10 are front elevational views, respectively, showing different bracket displaying plates employed in the viewfinder arrangement;

FIG. 9 is a front elevational view showing a masking plate employed in the viewfinder arrangement; and FIG. 11 is a view similar to FIG. 7, showing the movable elements of the viewfinder arrangement held in another position to show that the optical converter is held in the operative position.

DETAILED DESCRIPTION OF THE INVENTION

Figure 1:
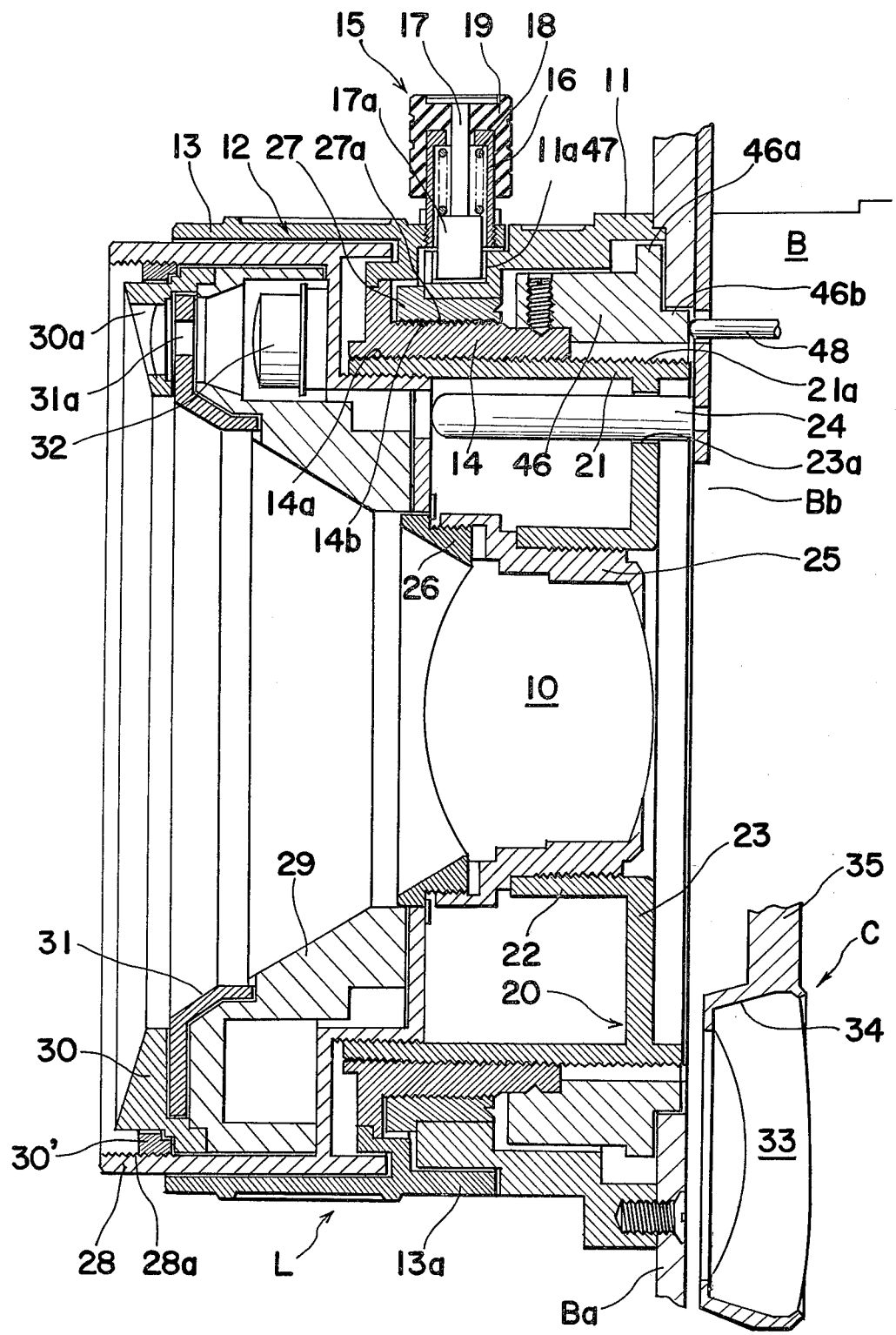
FIG. 1 is a longitudinal sectional view of an objective lens assembly secured to the body of a camera, with an optical converter shown in an inoperative position.

Before the description of the present invention proceeds, it is to be noted that like parts are designated by like reference numerals throughout the accompanying drawings.

Figure 2:
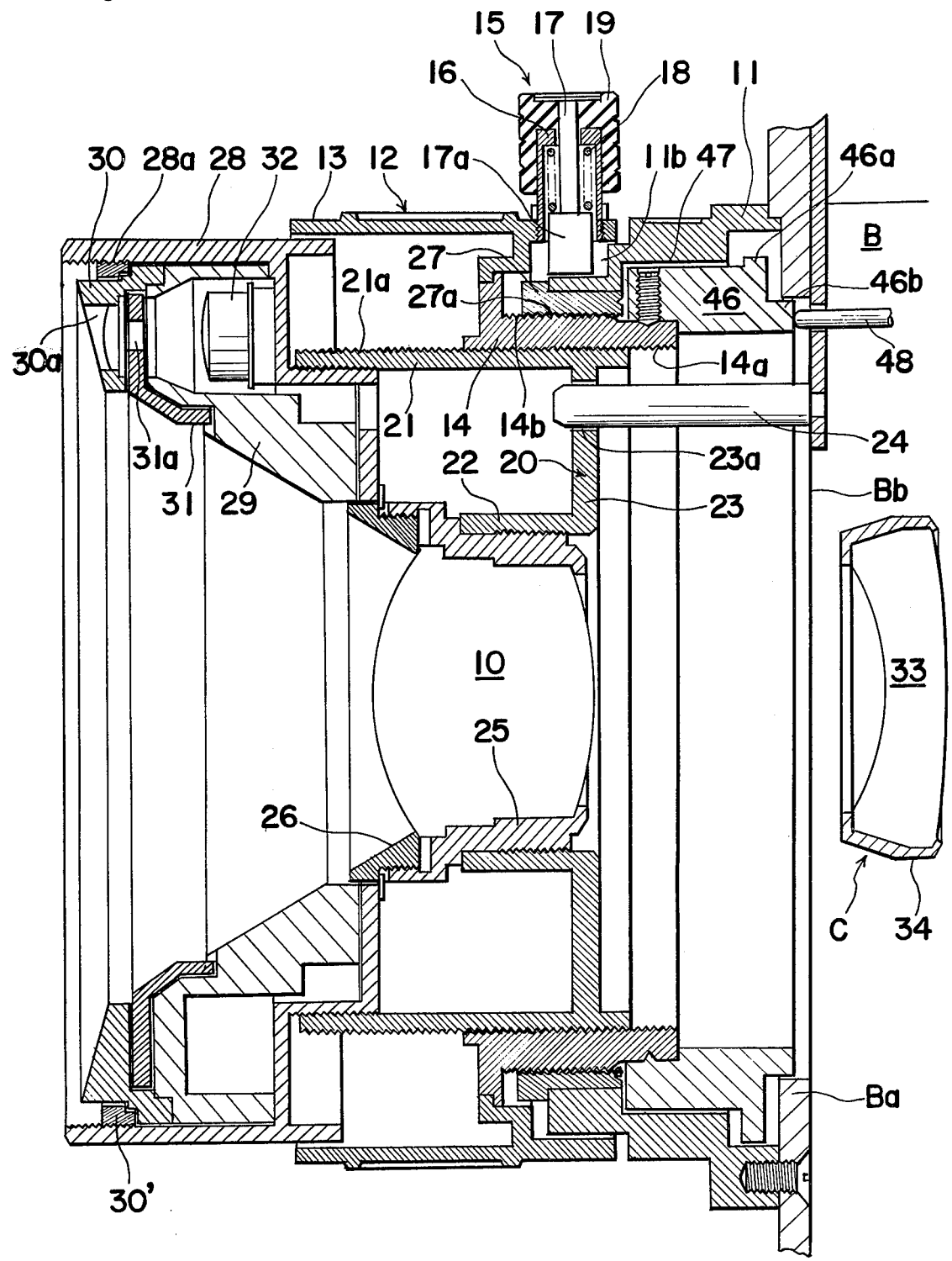
FIG. 2 is a view similar to FIG. 1, showing the optical converter held in an operative position.

Referring first to FIGS. 1 and 2, a photographic camera comprises a camera body B, including a front wall Ba having an opening Bb defined therein frontwardly of a photographic film (not shown) and rearwardly of an objective lens assembly L. The lens assembly L is shown to be rigidly secured to the camera body B in a manner as will be described later in alignment with the opening Bb and comprises an objective lens 10 which may be constituted by one or more lens elements or one or more groups of lens elements as is well known to those skilled in the art.

The objective lens assembly L further comprises a fixed barrel 11, having a rear end rigidly secured to the front wall Ba of the camera body and a front end portion reduced in diameter and formed with a pair of spaced circumferentially extending guide grooves 11a and 11b as best shown in FIG. 3, and a focusing barrel 12 mounted on the fixed barrel 11 for rotation about the optical axis of the objective lens 10 through a predetermined angle less than 360°, for example, 200°. This focusing barrel 12 is constituted by a focus adjusting ring 13 having a rear end portion 13a, positioned externally of and overlapping the front end portion of the fixed barrel 11, and carrying an intermediate transmission ring 14 extending internally of the focus adjusting ring 13 and inside the front end portion of the fixed barrel 11 and rigidly connected to, or otherwise integrally formed with, the focus adjusting ring 13 for rotation together with said focus adjusting ring 13.

The angle through which the focusing barrel 12 can be rotated about the optical axis of the lens 10 is defined between one end of the guide groove 11a, which is remote from the guide groove 11b, and one end of the guide groove 11b which is remote from the guide groove 11a, with an ungrooved portion 11c positioned between the other ends of the respective guide grooves 11a and 11b, as can readily be seen from FIG. 3. In other words, the angle through which the focusing barrel 12 can be manually rotated is substantially equal to the sum of the respective angles subtended by arcs of the guide grooves 11a and 11b and the angle subtended by the arc of the ungrooved area 11c of the front end portion of the fixed barrel 11. For the purpose of description of the present invention, it is assumed that, when the photographic camera is operable with a standard lens system, i.e., solely with the lens 10, focus adjustment can be carried out by rotating the focus adjusting ring 13 through the angle subtended by the arc of the guide groove 11a while, when the photographic camera is operable with a telephoto lens system, the focus adjustment can be carried out by rotating the focus adjusting ring 13 through the angle subtended by the arc of the guide groove 11b.

The rear end portions 13a of the focus adjusting ring 13 has a selector mechanism 15 rigidly mounted thereon and comprising a cylinder 16 having one end firmly threaded into the rear end portion 13a of the focus adjusting ring 13 and the other end apertured to support a stop pin 17. This stop pin 17 is of a shape having one end situated outside the cylinder 16 and the other end enlarged in diameter to provide a boss 17a adapted to be selectively engageable into any one of the guide grooves 11a and 11b defined in the front end portion of the fixed barrel 11. This stop pin 17 is normally so urged by a coil spring 18, disposed within the cylinder 16 between the apertured end of the cylinder 16 and the boss 17a, in one direction that the boss 17a is engaged into any one of the guide grooves 11a and 11b for the purpose as will be described later.

The selector mechanism 15 is so designed that, so long as the boss 17a is engaged in the guide groove 11a, the focusing barrel 12 can be rotated through a first predetermined focusing angle equal to the angle subtended by the arc of the guide groove 11a while, so long as the boss 17a is engaged in the guide groove 11b, the focusing barrel 12 can be rotated through a second predetermined focusing angle equal to the angle subtended by the arc of the guide groove 11b. Selective engagement of the boss 17a into any one of the guide grooves 11a and 11b can be carried out by rotating the focusing barrel 12, while the end of the stop pin 17 opposed to the boss 17a and having an elastic knob element 19 mounted thereon is outwardly pulled, to allow the boss 17a to pass over the ungrooved area 11c of the front end portion of the fixed barrel 11. Although not shown, as a matter of design choice, it is to be understood that, for avoiding any possible separation of the focusing barrel 12 from the fixed barrel, means for avoiding this possibility may be provided, which may comprise a groove, which may be defined in an ungrooved area of the front end portion of the fixed barrel which is substantially opposed to the ungrooved area 11c, and a pin member having one end engaged in such groove in the ungrooved area opposed to the ungrooved area 11c and the other end rigidly connected to the rear end portion of the focus adjusting ring 13.

The objective lens assembly L further comprises an axially movable barrel structure 20 including an outer barrel 21, having its outer peripheral surface formed with a helical thread 21a constantly engaged to a mating helical thread 14a defined on the inner peripheral surface of the intermediate transmission ring 14, and an inner barrel 22 rigidly or integrally connected to the outer barrel 21 by means of an annular flange 23 radially outwardly extending from a rear end extremity of the inner barrel 22 to a rear end portion of the outer barrel 21. This axially movable barrel structure 20 is non-rotatably, but axially movably supported in position by at least one guide rod 24 having one end rigidly secured to the front wall Ba of the camera body B and relatively slidably extending through a bearing aperture 23a defined in the annular flange 23.

A lens mount 25 for the support of the lens 10 which is held in position within the lens mount 25 and retained by a retainer ring 26 threaded to a front end of the lens mount 25, is threadingly inserted into the inner barrel 22 of the axially movable barrel structure 20 for movement together with said barrel structure 20.

In the construction so far described, it is clear that rotation of the focus adjusting ring 13 accessible to the hand of a photographer can be transmitted through the transmission ring 14 to the outer barrel 21 of the barrel structure 20 to move the barrel structure 20 axially along the guide rod 24 in a direction parallel to the optical axis of the lens 10. By so doing, the lens 10 can axially be moved for focus adjustment.

Positioned substantially intermediate between the front end portion of the fixed barrel 11 and the transmission ring 14 is a guide ring 27 having its outer peripheral surface rigidly connected to, or otherwise integrally formed with, the front end portion of the fixed barrel 11. If desired, this guide ring 27 may be omitted.

Threadingly secured to the outer barrel 21 and the retainer ring 26 and positioned frontwardly of the lens 10 is an outer covering barrel 28 having a helical thread defined at 28a, a portion of such helical thread adjacent the front end extremity of the covering barrel 28 being used to support a photographic filter (not shown). Carried by and positioned inside the covering barrel 28 is an outer decorative covering ring 29 which is retained in position by a retainer ring 30' through a fitting ring 30 with a rotary ring 31 positioned between rings 29 and 30.

As best shown in FIGS. 1 and 2, a light measuring element 32, electrically connected to a known exposure metering system (not shown) in any known manner, is rigidly secured to the outer covering barrel 28 with its light receiving area facing in a direction opposed to the camera body B. The rotary ring 31 can be manually rotatable through a predetermined angle about the optical axis of the lens 10 and has a plurality of apertures (only one of which is shown by 31a) of different sizes to permit the passage of the incoming light therethrough towards the light measuring element 31 in an amount appropriate to the sensitivity or speed of the photographic film loaded in the camera. In other words, this rotary ring 31 with the apertures 31a defined therein serves as a film sensitivity setting ring as is well known to those skilled in the art. To permit the passage of the incoming light towards the light measuring element 32 through a selected one of the apertures 31a in the rotary or film speed setting ring 31, the fitting ring 30 has a window 30a defined therein in alignment with the light measuring element 32.

The photographic camera embodying the present invention further comprises a telephoto converter assembly as best shown in FIG. 4 and generally designated by C. This telephoto converter C comprises a converter lens 33, which may be constituted by one or more lens elements or one or more groups of lens elements and which is carried by a lens mount 34 having an elongated arm 35 outwardly extending therefrom and supported in a manner as will be described later for pivotal movement between an inoperative position, as shown by the solid line in FIG. 4, and an operative position as shown by the chain line in FIG. 4. It is to be noted that the telephoto converter assembly C is positioned rearwardly of the front wall Ba and within the camera body B and that a shutter blade assembly of any known construction is to be understood as positioned between the objective lens 10 and the front wall Ba of the camera body B although not shown.

Figure 6:
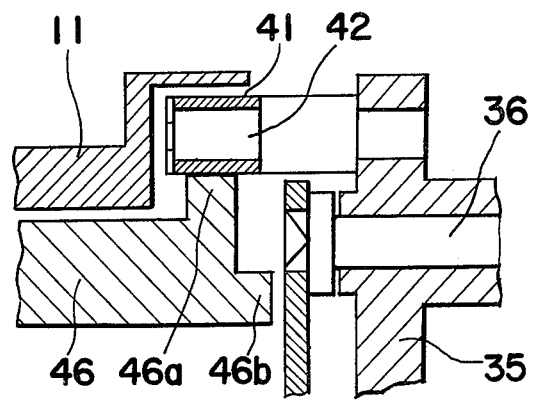
FIG. 6 is a longitudinal sectional view, on an enlarged scale, showing an operative connection between the support structure for the optical converter and the fixed barrel shown in FIG. 3.

Referring now to FIGS. 4 to 6, the arm 35 of the telephoto converter assembly C is positioned within the camera body B rearwardly of the front wall Ba and pivotally connected at its free end portion to the front wall Ba by means of a fitting bolt member 36. This arm 35 is normally urged towards the front wall Ba by a compression spring 37 disposed between the free end portion of the arm 35 and a head portion of the bolt member 36 as best shown in FIG. 5 so that, when the arm 35 is pivoted to the operative position with the lens 33 aligned with the optical axis of the objective lens 10 in a manner as will be described, the converter lens 33 can be brought to a predetermined position necessary to transmit a spatial image, formed by the objective lens 10 of a target object to be photographed, towards the film.

As readily understood from FIG. 4, the arm 35 shown as held in the inoperative position is normally biased to the operative position, in which the converter lens 33 is in alignment with the optical axis of the objective lens 10 by a wire spring 38 having one end engaged to a pin 39, secured to the arm 35, and the other end engaged to a pin 40 secured to the front wall Ba of the camera body, a substantially intermediate portion of said wire spring 38 being turned around and externally of the bolt member 36.

The free end portion of the arm 35 carries a roller 41 rotatably mounted on a support pin member 42 extending therefrom at right angles to the plane of the free end portion of the arm 35, said roller 41 being positioned frontwardly of the front wall Ba, that is, outside the camera body B, the function of which roller 41 will be described later. In addition, the free end portion of the arm 35 has a heel 43 protruding outwards therefrom in a direction substantially at right angles to the longitudinal axis of the bolt member 36, the function of said heel 36 being also described later.

Reference numeral 44 represents an eccentric sleeve member adjustably mounted on a fitting bolt 45 secured to the front wall Ba of the camera body B and to which the arm 35, when pivoted to the operative position as shown by the chain line in FIG. 4 in a manner as will be described, is engaged. In other words, the eccentric sleeve member 44 so supported defines the operative position for the pivotal movement of the arm 35. It is to be noted that, by rotating the eccentric sleeve member 44 about the longitudinal axis of the fitting bolt 45 while the latter is loosened, the operative position for the pivotal movement of the arm 35 can accurately be determined with the optical axis of the converter lens 33 exactly aligned with the optical axis of the objective lens 10 when the arm 35 is in the operative position.

Referring back to FIGS. 1 and 2, the transmission barrel 14 carried thereon a cam ring 46 having a front end overlapping and adjustably connected to a rear end of the transmission barrel 14 by means of an adjustment screw 47 axially threaded through the cam ring 46 and terminating in tight contact with the transmission barrel 14. Although this cam ring 46 is rotatable together with the transmission ring 14, that is, the focusing barrel 12, the adjustment screw 47 is employed for the purpose of fine adjustment of the position of the cam ring 46 relative to the transmission ring 14 so that, at the moment or shortly before the boss 17a of the selector mechanism 15 then moving over the ungrooved area 11c in the front end portion of the fixed barrel 11 in a direction close to the guide groove 11b falls into the guide groove 11b, the arm 35 can complete its pivotal movement from the inoperative position to the operative position with the lens 33 exactly aligned with the lens 10.

This cam ring 46 is formed at a rear end portion with a circumferential cam 46a, radially outwardly protruding therefrom, and an axial cam 46b axially protruding therefrom towards the front wall Ba of the camera body B. Constantly slidingly engaged to the axial cam 46b is a connecting rod 48 which axially moves, as the focus adjusting ring 13 is rotated for focus adjustment, the movement of said connecting rod 48 being transmitted to a viewfinder arrangement for the purpose of parallax correction as is well known to those skilled in the art.

It is the circumferential cam 46a of the cam ring 46 to which the roller 41 carried by pin 42 on the arm 35 of the telephoto converter assembly C is constantly engaged as best shown in FIG. 6. The constant engagement of the roller 41 to the circumferential cam 46a is achieved because, as described hereinbefore, the arm 35 is biased by the wire spring 38 to assume the operative position. This circumferential cam 46a is substantially shaped as shown by the phantom line P in FIG. 4 and so shaped as to achieve the following functions:

(1) So long as the focus adjusting ring 13 is manually rotated in either direction within the range of the first predetermined focusing angle with the boss 17a of the selector mechanism 15 engaged in the guide groove 11a in the front end portion of the fixed barrel 11 as schematically shown in FIG. 3, the incident rotation of the cam ring 46 does not cause the arm 35 of the converter assembly C to undergo any slight pivotal movement about the longitudinal axis of the bolt member 36 but the roller 41 carried by the free end portion of the arm 35 relatively rolls over the circumferential arm 46a without moving the arm 35.

(2) So long as the focus adjusting ring 13 is manually rotated in a clockwise direction, as viewed in FIG. 3, with the boss 17a moving over the ungrooved area 11c in the front end portion of the fixed barrel in sliding contact with or clear of the outer peripheral surface of the ungrooved area 11c, the roller 41 while rolling over the circumferential cam 46a relatively slides down with the axis of rotation of the roller 41 approaching in a direction close towards the optical axis of the lens 10, thereby causing the arm 35 to pivot from the inoperative position towards the operative position under the influence of the biasing force of the wire spring 38.

(3) Assuming that no external pulling force is applied to the knob element 19 to move the boss 17a in a direction away from the free end portion of the fixed barrel 11 against the spring 18, and at the moment or shortly before the boss 17a is engaged into one end of the guide groove 11b adjacent the ungrooved area 11c in the free end portion of the fixed barrel 11, the arm 35 completes its pivotal movement from the inoperative position to the operative position as shown by the broken line in FIG. 4 and as shown in FIG. 2, with the converter lens 33 optically aligned with the optical axis of the objective lens 10.

(4) So long as the focus adjusting ring 13 is manually rotated in either direction within the range of the second predetermined focusing angle with the boss 17a engaged in the guide groove 11b, the incident rotation of the cam ring 46 does not cause the arm 35 to underto any slight pivotal movement back to the inoperative position, but the roller 41 relatively rolls over the circumferential cam 46a without moving the arm 35.

From the foregoing, it will readily be seen that the reverse rotation of the focus adjusting ring 13 with the boss 17a moving from the guide groove 11b to the guide groove 11a over the ungrooved area 11c causes the arm 35 to pivot from the operative position against the wire spring 38 back to the inoperative position.

In addition, from the foregoing description, it has now become clear that, during the continued rotation of the focus adjusting ring 13 within the range of the total angle through which the adjusting ring 13 can be rotated, the converter lens 33 can selectively be brought into and out of alignment with the optical axis of the lens 10 merely by outwardly pulling the knob element 19 to allow the boss 17a to move over the ungrooved area 11c which separates the guide grooves 11a and 11b from each other. If desired, the selector mechanism 15, which has now become clear as functioning to select any one of the standard lens system, in which only the objective lens 10 is utilized to shot a photographic picture of the target object, and the telephoto lens system in which a combination of the objective lens 10 with the converter lens 13 is utilized to shot a photographic picture of the target object, may be omitted, in which case the selective switching between the standard lens system and the telephoto lens system can readily be achieved merely by rotating the focus adjusting ring 13.

Moreover, should the selector mechanism 15 be employed such as shown, such an alternative is possible that the selector mechanism 15 be so designed as to allow the boss 17a to be disengaged out of any one of the guide grooves 11a and 11b when an external pushing force is applied to the knob element 19 although in the illustrated arrangement the external pulling force is required to achieve this function.

As is well known to those skilled in the art, the camera rangefinder arrangement is so designed that two images of the same target object to be photographed, which are transmitted to the eyepiece through which the photographer can aim the camera at the target object, blend into one, i.e., are matched to each other when the image of the target object transmitted to the photographic film is correctly focused on such film. For this purpose, the camera rangefinder arrangement generally comprises a casing rigidly mounted on the top of the camera body and having first and second windows spaced apart from each other, the first window linearly aligned with the eyepiece and the second window positioned laterally of the first window. The optical system of the rangefinder arrangement is such that, while the incoming light, entering the first window and carrying one image of the target object, travels towards the eyepiece through a first semitransparent mirror positioned between the eyepiece and the first window, the incoming light, entering the second window and carrying another image of the same target object, travels towards the same eyepiece after having been deflected by a second semitransparent mirrow towards the first semitransparent mirror and then deflected by the first semitransparent mirror. The second semitransparent mirror is operatively associated with the focus adjusting ring so that, when the focus adjusting ring is rotated to a position where the image of the target object transmitted through the camera lens system towards the photosensitive film is correctly focused, said one and another images can be matched to each other.

On the other hand, since the photographic camera embodying the present invention has two lens system as hereinbefore fully described, it is desirable that the rangefinder arrangement has a capability of presenting to the sight of the photographer necessary information associated with the type of lens system, either standard or telephoto, which is brought into operation. For this purpose, the rangefinder arrangement in the photographic camera embodying the present invention has an index frame display structure disposed between the second window in the casing and the second semitransparent mirror and having such a construction as will now be described with particular reference to FIGS. 7 to 11. It is to be noted that, except for the index frame display structure which will now be described, the other components of the rangefinder and their arrangement are well known to those skilled in the art and, therefore, the details thereof are herein omitted for the sake of brevity.

Referring now to FIGS. 7 to 11, the index frame display structure comprises a substantially rectangular fixed plate 50 having a plurality of, for example, three guide pins 51a, 51b and 51c rigidly secured to one surface thereof, a substantially rectangular movable plate 52 having diagonally extending grooves 53a, 53b and 53c and connected to the fixed plate 50 in face-to-face relation thereto with the grooves 53a, 53b and 53c receiving the respective guide pins 51a, 51b and 51c on the fixed plate 50 therethrough, and a masking plate 54 supported in a manner as will be described later for movement between raised and lowered positions.

Figure 8:
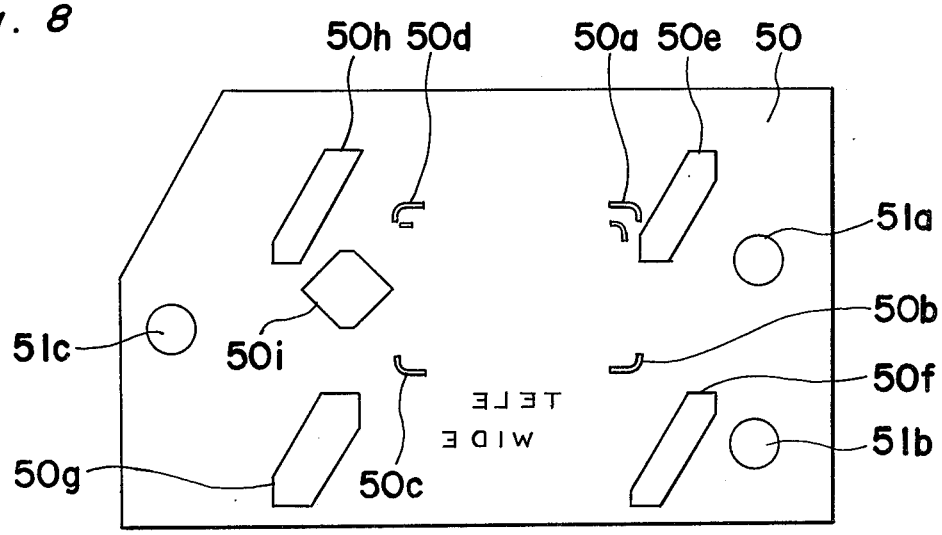

As best shown in FIG. 8, the fixed plate 50 has at least four bracket-shaped slots 50a, 50b, 50c and 50d occupying the respective positions of the four corners of a substantially central rectangular area of the fixed plate 50, which central rectangular area corresponds to the size of the image of the target object that can be photographed on the photosensitive film with the telephoto lens system. The fixed plate 50 also has four diagonally extending slots 50e, 50f, 50g and 50h at respective positions substantially externally of the central rectangular area and adjacent the bracket-shaped slots 50a, 50b, 50c and 50d, and two blanked indicium, one indicia reading "TELE" and the other indicia reading "WIDE". In addition thereto, the fixed plate 50 has a substantially rhombic opening 50i for allowing the incoming light carrying the image of the target object to pass therethrough towards the second semitransparent mirror and then towards the eyepiece after having deflected by the second semitransparent mirror and then the first semitransparent mirror as described above. It is to be noted that the term "WIDE" forming one of the blanked indicium on the fixed plate 50 is not intended to means of a wide angle photography according to the general notion in the field of photography, but is intended to means of the angle of coverage of the standard lens assembly L in relation to the telephoto lens system composed of the combination of the standard lens assembly L with the telephoto converter 33.

Referring now to FIG. 10, the movable plate 52 has four bracket-shaped slots 52a, 52b, 52c and 52d occupying the respective positions of the four corners of a substantially central rectangular area of the movable plate 50, which central rectangular area corresponds to the size of the image of the target object that can be photographed on the photosensitive film with the standard lens system and is proportionally larger than the central rectangular area on the fixed plate 50 which is surrounded by the bracket-shaped slots 50a to 50d. This movable plate 52 also has four openings 52e, 52f, 52g and 52h, each of these openings 52e to 52h being so sized as will be described later.

The openings 52e and 52g are so sized as to expose therethrough the associated bracket-shaped slots 50a and 50c on the fixed plate 50 irrespective of the position of the movable plate 52 relative to the fixed plate 50. The opening 52f is so sized as to expose therethrough not only the bracket-shaped slot 50b on the fixed plate 50, but also both of the "TELE" and "WIDE" indicium blanked in the fixed plate 50, irrespective of the position of the movable plate 52 relative to the fixed plate 50. The opening 52h is so sized as to expose not only the bracket-shaped slot 50d on the fixed plate 50, but also the substantially rhombic opening 50i on the fixed plate 50 irrespective of the position of the movable plate 52 relative to the fixed plate 50.

The masking plate 54 movable between the raised and lowered positions is best shown in FIG. 9 and has a substantially rectangular opening 54a and a recess 54b defined therein for exposing therethrough the bracket-shaped slots 50c and 50b on the fixed plate 50 when the masking plate 54 is moved to the lowered position in a manner as will be described later and as shown in FIG. 11. It is to be noted that, at this time, a pair of opposed peripheral portions 54c and 54d are clear of the respective positions of the bracket-shaped slots 50a and 50d. Nevertheless, when the masking plates 54 is moved to the raised position as shown in FIG. 7, all of the bracket-shaped slots 50a to 50d on the fixed plate 50 can be masked and, therefore, the photographer looking through the rangefinder eyepiece can see only the bracket-shaped slots 52a to 52d on the movable plate 52.

The masking plate 54 also has a pair of rectangular openings 54e and 54f extending in parallel relation to each other and diagonally spaced apart from each other a distance equal to the stroke of movement of the masking plate 54 between the raised and lowered positions and greater than the spacing between the "TELE" and "WIDE" indicium on the fixed plate 50. Specifically, the opening 54e on the masking plate 54 is so sized and so positioned that, when the masking plate is held in the raised position as shown in FIG. 7, only the "WIDE" indicia on the fixed plate 50 can be exposed therethrough, while the bracket-shaped slots 50a to 50d are concurrently masked as hereinbefore described. On the other hand, the opening 54f on the masking plate 54 is so sized and so positioned that, when the masking plate is held in the lowered position as shown in FIG. 11, not only can the bracket-shaped slots 50a to 50d on the fixed plate 50 be exposed therethrough, but also the "TELE" indicia can be exposed therethrough to show that the camera is in position to shoot a photographic picture of the target object with the telephoto lens system.

The movable plate 52 is movable in a diagonal direction parallel to the plane of the fixed plate 50 with the guide pins 51a to 51c on the fixed plate 50 relatively guided along the respective grooves 53a to 53c in the movable plate 52 for the purpose of parallax correction as is well known to those skilled in the art. For this purpose, the connecting rod 48 (FIGS. 1 and 2) is so operatively associated with an eccentric cam member 55, on which a lower edge of the movable plate 50 rests, that, when the focus adjusting ring 13 is rotated to a position where the camera-to-object distance scale reads the minimum distance, the movable plate 52 is diagonally lowered while, when the focus adjusting ring 13 is rotated reversely to a position where the camera-to-object distance scale reads the infinity, the movable plate 52 is diagonally upwardly shifted to a position as shown in FIG. 7. In this way, the parallax correction can be achieved.

Figure 7:
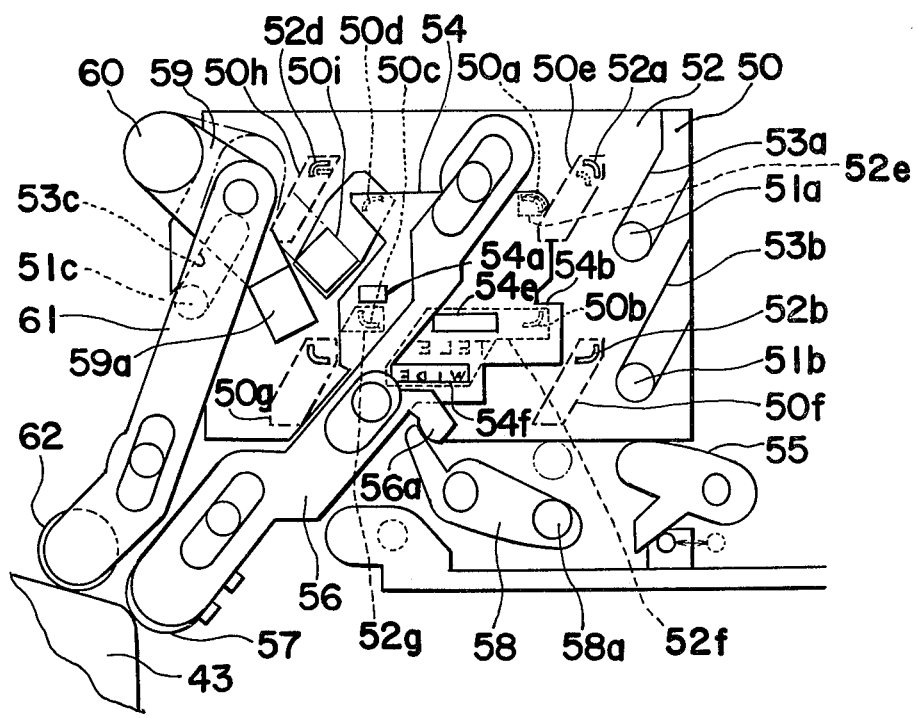
FIG. 7 is a front elevational view of a viewfinder lighting window assembly with its movable elements shown to be held in position to show that the optical converter is in the inoperative position.

For moving the masking plate 54 between the raised and lowered positions, as best shown in FIG. 7, an operating lever 56 carries the masking plate 54 at a substantially intermediate portion thereof and supported in position for movement in a direction substantially parallel to the direction of extension of any one of the guide grooves 53a to 53c in the movable plate 52. This operating lever 56 has one end carrying a roller 57 engageable with the heel 43 (FIG. 4) on the arm 35 and is so operatively associated with the converter assembly C that the masking plate 54 can be moved to the raised position in response to the movement of the arm 35 to the inoperative position and to the lowered position in response to the movement of the arm 35 to the operative position.

To avoid an undesirable movement of the movable plate 52 relative to the fixed plate 50, when the masking plate 54 is held in the lowered position, in accordance with the movement of the eccentric cam member 55 effected in response to the movement of the connecting rod 48, means for locking the movable plate in the diagonally upwardly shifted position as shown in FIG. 7 is employed. This locking means is constituted by a lock lever 58 pivotally supported in position at a substantially intermediate portion thereof and having one end rigidly carrying a stop pin 58a and the other end engageable with a projection 56a protruding outwards from a substantially intermediate portion of the operating lever 56. Accordingly, when the operating lever 56 is diagonally downwardly shifted as viewed in FIG. 7 in response to the movement of the arm 35 to the operative position with the heel 43 positioned as shown by the broken line in FIG. 4 and with the masking plate 54 consequently moved to the lowered position, the stop pin 58a carried by the lock lever 58 is engaged to the lower edge of the movable plate 52, as shown by the broken line in FIG. 7, to lock the latter in the diagonally upwardly shifted position as shown in FIG. 7.

The index frame display structure further comprises means for masking the substantially rhombic opening 50i to substantially malfunction the viewfinder arrangement and hence to warn the photographer that the arm 35 is moving between the inoperative position and the operative position, that is, the focus adjusting ring 13 is being rotated with the boss 17a riding over the ungrooved area 11c in the front end portion of the fixed barrel 11. This warning means comprises a masking lever 59 pivotally supported at 60 for movement between masked and unmasked positions and having a free end 59a adapted to mask the opening 50i to interrupt the transmission of the incoming light therethrough when the lever 50 is pivoted to the masked position. This masking lever 59 is operatively coupled to an operating lever 61 having one end pivotally connected to a substantially intermediate portion of the masking lever 59 and the other end carrying a roller 62 engageable with the heel 43, a substantially intermediately portion of said lever 61 being loosely connected to a fixed portion of the viewfinder casing.

While constructed as hereinbefore described, the warning means is so designed that, only during the movement of the arm 35 between the inoperative position and the operative position, the masking lever 59 can be positioned between the unmasked and masked positions.

It is to be noted that, although not shown because of a routine expedient in the art involved, the operating levers 56 and 61 are to be understood as biased by any suitable biasing means, for example, tension springs or leaf springs, in respective directions with the rollers 57 and 62 assuredly contacting the heel 43 during the movement of the arm 35 between the inoperative and operative positions.

While the photographic camera embodying the present invention is constructed as hereinbefore fully described, the operation thereof will now be described.

Assuming that the photographer desires to shoot a target object with the standard lens system, that is, by the utilization of the objective lens 10, and therefore, the boss 17a of the selector mechanism 15 is engaged in the guide groove 11a as shown in FIG. 1, the rotation of the focus adjusting ring 13 to cause the objective lens 10 to focus the image of the target object on the photosensitive film can be effected only within the range of the first predetermined focusing angle about the optical axis of the lens 10. In this condition, the arm 35 of the converter assembly C is held in the inoperative position. On the other hand, the rangefinder arrangement is such that the masking plate 54 is held in the raised position as shown in FIG. 7 and, therefore, optical images of the bracket-shaped slots 52a to 52d and the "WIDE" indicia can be viewable to the eye of the photographer looking through the rangefinder eyepiece.

During this condition, if the focus adjusting ring 13 is rotated, the connecting rod 48 is axially moved, the motion of this rod 48 being transmitted to the second semitransparent mirror to move the reflected image of the target object relative to the directly viewed image of the same target object to effect a distance measurement and also to the eccentric cam member 55 to effect parallax correction. As is well known to those skilled in the art, when the reflected image and the directly viewed image blend into one image, the objective lens 10 is brought in focus.

Starting from the condition as described above, should the photographer desire to shoot the target object with the telephoto lens system, that is, by the utilization of the lens 10 in combination with the converter lens 33, what is necessary is to rotate the focus adjusting ring 13, while the knob element 19 is outwardly pulled to allow the boss 17a to ride over the ungrooved area 11c, until the boss 17a when no external pulling force is applied to the knob element 19 can engage into the guide groove 11b as shown in FIG. 2. During the movement of the boss 17a over the ungrooved area 11c, that is, during the switching from the standard lens system to the telephoto lens system, the masking lever 59 is brought in position with the free end portion 59a intercepting the the passage of light through the rhombic opening 50i to warn the photographer that the lens system is being switched from the standard lens system to the telephoto lens system.

Simultaneously therewith, the masking plate 54 is being moved from the raised position towards the lowered position on one hand and the arm 35 of the converter assembly C is pivoted from the inoperative position towards the operative position as biased by the wire spring 38.

No sooner the boss 17a is engaged into one end of the guide groove 11b adjacent the ungrooved area 11c than the converter arm 35 is brought to the operative position with the converter lens 33 exactly aligned with the optical axis of the objective lens 10 as shown in FIG. 2. Simultaneously therewith, the operating lever 61 is diagonally downwardly shifted to bring the masking lever 59 to the unmasked position on one hand and the operating lever 56 is also diagonally downwardly shifted to bring the masking plate 54 to the lowered position as shown in FIG. 11 on the other hand.

At the time of completion of the movement of the operating lever 56 to the diagonally downwardly shifted position, the projection 56a extending from said lever 56 causes the lock lever 58 to pivot counterclockwise, as viewed in FIG. 7, with the stop pin 58a locking the movable plate 52 in the diagonally upwardly shifted position as hereinbefore described.

In this condition, in addition to the images of the bracket-shaped slots 52a to 52d on the plate 52, the images of the bracket-shaped slots 50a to 50d on the plate 50 can be viewed to the sight of the photographer through the finder eyepiece together with the image of the "TELE" indicia, while the "WIDE" indicia is masked by the masking plate 54 as shown in FIG. 11.

The reverse operation results in switching from the telephoto lens system over to the standard lens system as can readily be understood by those skilled in the art.

It is to be noted that, in order to render the rangefinder to be operable even when the camera is operable with the telephoto lens system, the axial cam 46b on the cam ring 46 is to be understood as composed of a first axial cam portion operable to reciprocately move the connecting rod 48 during the focusing operation with the focus adjusting ring 13 rotated through the first predetermined focusing angle, and a second axial cam portion operable to reciprocately move the connecting rod 48 during the focusing operation with the focus adjusting ring 13 rotated through the second predetermined focusing angle.

Although the present invention has fully been described in connection with the preferred embodiment thereof with reference to the accompanying drawings, it is to be noted that various changes and modifications are apparent to those skilled in the art. By way of example, instead of the employment of the selector mechanism 15 of the construction as hereinbefore fully described, any known detent mechanism may be employed which may be of a type that give a click response to the hand of the photographer as the focus adjusting ring 13 is rotated over the boundary between the guide grooves 11a and 11b.

Furthermore, in order to enhance the viewability of the combined information of "TELE" indicia and the bracket-shaped slots 50a to 50d during the telephoto shooting, these slots may be covered with a colored, for example, yellow-colored, glass. Moreover, by the utilization of the movement of the operating lever 56 or 61, it would be obvious to those skilled in the art to employ a shutter locking mechanism to lock the shutter release button during the switching of the camera lens system between the standard lens system and the telephoto lens system.

These changes and modifications are to be understood as included within the true scope of the present invention unless they depart therefrom.

I claim:

1. A photographic camera comprising, in combination:

a camera body including a front wall having an opening therein at a position opposed to a focal plane within the camera body where a photosensitive film, when loaded in the camera, is positioned;

an objective lens assembly including a fixed barrel having one end secured to the camera body in alignment with the opening in said front wall of the camera body, an objective lens means providing a principal optical system of a first predetermined focal length, a lens mount means for supporting the objective lens means for movement together therewith, a focusing barrel means positioned on one side of the fixed barrel remote from the camera body, in alignment with any one of the fixed barrel and the optical axis of the objective lens means, said focusing barrel means being supported by said fixed barrel for rotation about the optical axis of the objective lens means through first and second predetermined focusing angles, and a motion translating barrel means positioned substantially internally of the fixed barrel and the focusing barrel means and externally of said lens mount means for transmitting rotary motion of said focus adjusting barrel means to said lens mount means to move the latter in an axial direction parallel to the optical axis of the objective lens means, said force adjusting barrel means, when rotated through the first predetermined focusing angle, rendering the principal optical system operable to take a photographic picture of a target object to be photographed and said focus adjusting barrel means, when rotated through the second predetermined focusing angle, rendering another optical system of a second predetermined focal length, different from said first predetermined focal length of said principal optical system, operable to take a photographic picture of a target object to be photographed;

a converter lens means;

means for supporting said converter lens means for movement between an operative position, in which the converter lens means is exactly in alignment with the optical axis of the objective lens means to provide said another optical system in cooperation with said objective lens means, and an inoperative position in which the converter lens means is out of alignment with the optical axis of the objective lens means; and means for causing said supporting means to move from the inoperative position to the operative position in response to change from the capability of rotation of the focus adjusting barrel means within the range of the first predetermined focusing angle to the capability of rotation of the focus adjusting barrel means within the range of the second predetermined focusing angle, and vice versa, said supporting means comprising a pivotably supported, elongated arm member having one end rigidly carrying the converted lens means and the other end carrying an engagement element, means for biasing said arm member toward the operative position and wherein said causing means comprises cam means operatively coupled to the focus adjusting barrel means, said cam means having a cam in constant engagement with said engagement element under the influence of the biasing force of said biasing means and said cam being shaped such that, so long as the focus adjustment barrel means is rotated within the range of the first predetermined focusing angle, the supporting means is held in the operative position, and so long as the focus adjusting barrel means is rotated within the range of the second predetermined focusing angle, the supporting means is held in the inoperative position.

2. A photographic camera comprising, in combination:

a camera body including a front wall having an opening therein at a position opposed to a focal plane within the camera body where a photosensitive film, when loaded in the camera, is positioned;

an objective lens assembly including a fixed barrel having one end secured to the camera body in alignment with the opening in said front wall of the camera body, an objective lens means providing a principal optical system of a first predetermined focal length, a lens mount means for supporting the objective lens means for movement together therewith, a focusing barrel means positioned on one side of the fixed barrel remote from the camera body, in alignment with any one of the fixed barrel and the optical axis of the objective lens means, said focusing barrel means being supported by said fixed barrel for rotation about the optical axis of the objective lens means through first and second predetermined focusing angles, and a motion translating barrel means positioned substantially internally of the fixed barrel and the focusing barrel means and externally of said lens mount means for transmitting rotary motion of said focus adjusting barrel means to said lens mount means to move the latter in an axial direction parallel to the optical axis of the objective lens means, said focus adjusting barrel means, when rotated through the first predtermined focusing angle, rendering the principal optical system operable to take a photographic picture of a target object to be photographed and said focus adjusting barrel means, when rotated through the second predetermined focusing angle, rendering another optical system of a second predetermined focal length, different from said first predetermined focal length of said principal optical system, operable to take a photographic picture of a target object to be photographed;

a converter lens means;

means for supporting said converter lens means for movement between an operative position, in which the converter lens means is exactly in alignment with the optical axis of the objective lens means to provide said another optical system in cooperation with said objective lens means, and an inoperative position in which the converter lens means is out of alignment with the otpical axis of the objective leans means; and means for causing said supporting means to move from the inoperative position to the operative position in response to change from the capability of rotation of the focus adjusting barrel means within the range of the first predetermined focusing angle to the capability of rotation of the focus adjusting barrel means within the range of the second predetermined focusing angle, and vice versa, and wherein said supporting means comprises a pivotally supported, elongated arm member having one end rigidly carrying the converter lens means and the other end carrying an engagement element and means for biasing said arm member towards the operative position, and wherein said causing means comprises a cam ring means supported for rotation together with the focus adjusting barrel means and positioned substantially internally of the fixed barrel and externally of the lens mount means, said cam ring means having a circumferential cam to which said engagement element is constantly engaged under the influence of the biasing force of said biasing means, and said circumferential cam being so shaped that, so long as the focus adjusting barrel means is rotated within the range of the first predetermined focusing angle, the supporting means is held in the operative position and, so long as the focus adjusting barrel means is rotated within the range of the second predetermined focusing angle, the supporting means is held in the inoperative position.

3. A photographic camera as claimed in claim 1, wherein said focus adjusting barrel means includes a focus adjusting ring having one end adjacent the fixed barrel overlapping and mounted on the other end portion of the fixed barrel, and wherein said first and second predetermined focusing angles are respectively defined by first and second guide grooves formed circumferentially on the outer peripheral surface of said other end portion of said fixed barrel, the sum of the angles subtended by the arcs of the respective guide grooves being less than 360° with respect to the optical axis of the objective lens means, said first and second guide grooves being spaced from each other with a pair of ungrooved areas left in said outer end portion of said fixed barrel between said first and second guide grooves, and said camera further comprising means carried by said focus adjusting ring for selective engagement with any one of said first and second guide grooves.

4. A photographic camera as claimed in claim 2, wherein said focus adjusting barrel means includes a focus adjusting ring having one end adjacent the fixed barrel overlapping and mounted on the other end portion of the fixed barrel, and wherein said first and second predetermined focusing angles are respectively defined by first and second guide grooves formed circumferentially on the outer peripheral surface of said other end portion of said fixed barrel, the sum of the angles subtended by the arcs of the respective guide grooves being less than 360° with respect to the optical axis of the objective lens means, said first and second guide grooves being spaced from each other with a pair of ungrooved areas left in said outer end portion of said fixed barrel between said first and second guide grooves, and said camera further comprising means carried by said focus adjusting ring for selective engagement into any one of said first and second guide grooves.

5. A photographic camera as claimed in claim 2, wherein said camera body further includes a rangefinder arrangement having an index frame display structure for presenting to the eye of a photographer, looking through the viewfinder arrangement, information showing whether the camera is ready to shoot with the principal lens system or whether the camera is ready to shoot with said another lens system, and said index frame display structure being operatively coupled to a cam formed on said arm member.

6. A photographic camera comprising, in combination:
   a camera body including a front wall having an opening therein at a position opposed to a focal plane within the camera body where a photosensitive film, when loaded in the camera, is positioned:
   an objective lens assembly including a fixed barrel having one end secured to the camera body in alignment with the opening in said front wall of the camera body, an objective lens means providing a principal optical system of a first predetermined focal length, a lens mount means for supporting the objective lens means for movement together therewith, a focusing barrel means supported in alignment with any one of the fixed barrel and the optical axis of the objective lens means by said fixed barrel for rotation about the optical axis of the objective lens means through first and second predetermined focusing angles, and a motion translating means for transmitting rotary motion of said focus adjusting barrel means to said lens mount means to move the latter in an axial direction parallel to the optical axis of the objective lens means, said focus adjusting barrel means, when rotated through the first predetermined angle, effecting a focus adjustment of the principal optical system with respect to a target object to be photographed and said focus adjusting barrel means, when rotated through the second predetermined angle, effecting a focus adjustment of another optical system of a second predetermined focal length different from said first predetermined focal length of said principal optical system with respect to a target object to be photographed;
   a converter lens means;
   means for supporting said converter lens means for movement between an operative position, in which the converter lens means is exactly in alignment with the optical axis of the objective lens means to provide said another optical system in cooperating with said objective lens means, and an inoperative position in which the converter lens means is out of alignment with the optical axis of the objective lens means; and
   means for causing said supporting means to move from the inoperative position to the operative position in response to change from the capability of rotation of the focus adjusting barrel means within the range of the first predetermined focusing angle to the capability of rotation of the focus adjusting barrel means within the range of the second predetermined focusing angle, and vice versa, said supporting means comprising a pivotably supported, elongated arm member having one end rigidly carrying the converted lens means and the other end carrying an engagement element, means for biasing said arm member toward the operative position and wherein said causing means comprises cam means operatively coupled to the focus adjusting barrel means, said cam means having a cam in constant engagement with said engagement element under the influence of the biasing force of said biasing means and said cam being shaped such that, so long as the focus adjustment barrel means is rotated within the range of the first predetermined focusing angle, the supporting means is held in the operative position, and so long as the focus adjusting barrel means is rotated within the range of the second predetermined focusing angle, the supporting means is held in the inoperative position.

* * * * *